United States Patent
Bodenmüller et al.

(10) Patent No.: US 10,870,127 B2
(45) Date of Patent: Dec. 22, 2020

(54) CARTRIDGE FOR A MIXING AND DISPENSING SYSTEM

(71) Applicant: Sulzer Mixpac AG, Haag (CH)

(72) Inventors: Tobias Bodenmüller, Eriskirch (DE); Hayden Turner, Ayer, MA (US)

(73) Assignee: SULZER MIXPAC AG, Haag (CH)

( * ) Notice: Subject to any disclaimer, the term of this patent is extended or adjusted under 35 U.S.C. 154(b) by 0 days.

(21) Appl. No.: 16/149,486

(22) Filed: Oct. 2, 2018

(65) Prior Publication Data
US 2020/0101488 A1  Apr. 2, 2020

(51) Int. Cl.
*B05C 17/005* (2006.01)
*B01F 15/00* (2006.01)
*B65D 83/00* (2006.01)

(52) U.S. Cl.
CPC .... *B05C 17/00583* (2013.01); *B01F 15/0085* (2013.01); *B01F 15/0087* (2013.01); *B05C 17/00516* (2013.01); *B05C 17/00559* (2013.01); *B05C 17/00596* (2013.01); *B65D 83/0072* (2013.01); *B01F 2215/0039* (2013.01); *B65D 2231/001* (2013.01)

(58) Field of Classification Search
CPC ........ B05C 17/00583; B05C 17/00516; B05C 17/00559; B05C 17/00596; B01F 15/0085; B01F 15/0087; B01F 2215/0039; B01F 2231/001; B65D 83/0072
See application file for complete search history.

(56) References Cited

U.S. PATENT DOCUMENTS

| | | |
|---|---|---|
| 3,275,193 A | 9/1966 | Barr |
| 3,467,283 A | 9/1969 | Kinnavy |
| 3,905,517 A | 9/1975 | Friedrich et al. |
| 3,979,025 A | 9/1976 | Friedrich et al. |
| 4,233,725 A | 11/1980 | Burger |
| 4,687,663 A | 8/1987 | Schaeffer |
| 5,002,623 A | 3/1991 | Steer et al. |
| 5,184,757 A | 2/1993 | Giannuzzi |
| 5,305,920 A | 4/1994 | Reiboldt et al. |

(Continued)

FOREIGN PATENT DOCUMENTS

| | | |
|---|---|---|
| DE | 3500625 A1 | 8/1985 |
| DE | 29606895 U1 | 7/1997 |

(Continued)

OTHER PUBLICATIONS

Jakob Lange, Haroun Mokdad and Yves wyser, Understanding Puncture Resistance and Peforation Behavior of Packaging Laminates, Journal of Plastic Film & Sheeting, vol. 18, 231-244 (Year: 2002).*

*Primary Examiner* — Jeremy Carroll
(74) *Attorney, Agent, or Firm* — Global IP Counselors, LLP (57) ABSTRACT

A cartridge for a one or two-component mixing and dispensing system includes at least one flexible film bag as a cartridge wall, a rigid front part that is in particular integrally formed with the at least one flexible film bag and that is arranged at a front end section of the at least one film bag, the rigid front part including at least one outlet opening. The cartridge for a two-component mixing and dispensing system has a first flexible film bag as a cartridge wall and a second flexible film bag as a cartridge wall, and a structure surrounding the cartridge.

17 Claims, 11 Drawing Sheets

(56) References Cited

U.S. PATENT DOCUMENTS

| | | | |
|---|---|---|---|
| 5,360,146 A | 11/1994 | Ikushima | |
| 5,409,143 A | 4/1995 | Sigel et al. | |
| 5,593,066 A * | 1/1997 | Konuma | B05C 17/00506 |
| | | | 222/94 |
| 5,647,510 A | 7/1997 | Keller | |
| 5,993,720 A | 11/1999 | Konuma et al. | |
| 6,129,244 A | 10/2000 | Horth | |
| 6,334,548 B1 | 1/2002 | Ichikawa et al. | |
| 6,971,787 B2 | 12/2005 | Botrie et al. | |
| 7,137,531 B2 | 11/2006 | Arghyris et al. | |
| 7,144,170 B2 | 12/2006 | Parks et al. | |
| 7,445,135 B2 | 11/2008 | Miyata et al. | |
| 7,815,384 B2 | 10/2010 | Parks et al. | |
| 8,276,755 B2 | 10/2012 | Matsumura et al. | |
| 8,690,012 B2 | 4/2014 | Stoeckli et al. | |
| 9,238,544 B2 * | 1/2016 | Schulz | B65D 81/325 |
| 9,517,488 B2 | 12/2016 | Frey | |
| 9,968,959 B2 | 5/2018 | Frey | |
| 2004/0000562 A1 | 1/2004 | Gantner | |
| 2005/0109796 A1 | 5/2005 | Bourque et al. | |
| 2005/0138792 A1 | 6/2005 | Black et al. | |
| 2006/0021996 A1 | 2/2006 | Scott et al. | |
| 2006/0144854 A1 | 7/2006 | Clemens et al. | |
| 2006/0188314 A1 | 11/2006 | Hunter et al. | |
| 2010/0108709 A1 | 5/2010 | Frey | |
| 2014/0091094 A1 * | 4/2014 | Habibi-Naini | B65D 81/325 |
| | | | 220/500 |
| 2014/0117046 A1 * | 5/2014 | Ettlin | B05C 17/00553 |
| | | | 222/145.5 |
| 2014/0158717 A1 * | 6/2014 | Ettlin | B05C 17/01 |
| | | | 222/327 |
| 2014/0174037 A1 | 6/2014 | Frey | |
| 2014/0203023 A1 * | 7/2014 | Ettlin | B05C 17/00553 |
| | | | 220/507 |
| 2016/0045928 A1 | 2/2016 | Frey | |
| 2016/0089689 A1 | 3/2016 | Cook | |
| 2017/0072426 A1 | 3/2017 | Frey | |
| 2017/0216874 A1 * | 8/2017 | Turner | B05C 17/01 |
| 2018/0169693 A1 | 6/2018 | Frey | |

FOREIGN PATENT DOCUMENTS

| | | |
|---|---|---|
| DE | 202010013856 U1 | 3/2012 |
| EP | 1058657 B1 | 5/2003 |
| EP | 1266844 B1 | 1/2007 |
| EP | 1284163 B1 | 3/2008 |
| EP | 2322449 B1 | 6/2012 |
| EP | 3195941 A1 | 7/2017 |
| FR | 2820127 A1 | 8/2002 |
| JP | H03133748 A | 6/1991 |
| JP | 6-53469 A | 2/1994 |
| JP | 6-336254 A | 12/1994 |
| JP | 2001225853 A | 8/2001 |
| JP | 3624132 B2 | 3/2005 |
| JP | 4248694 B2 | 4/2009 |
| WO | 91/07333 A1 | 5/1991 |
| WO | 2003053814 A1 | 7/2003 |

\* cited by examiner

CARTRIDGE FOR A MIXING AND DISPENSING SYSTEM

BACKGROUND

Field of Invention

The present invention relates to a cartridge for a one or two-component mixing and dispensing system.

Background Information

Cartridges are, for example, filled with sealants or adhesives and are used in a pistol-like one or two-component mixing and dispensing system in order to dispense the material contained therein. The one or two-component mixing and dispensing system for some systems has, such as for example, the so-called side-by-side cartridge, a piston for each of the container units of the cartridge filled with sealant or adhesive, with the piston being configured to bring about a dispensing of the sealant or the adhesive from the cartridge. Also, so-called coaxial cartridges can be used, in which only one piston is used for the purpose of dispensing a material stored therein.

SUMMARY

The invention is based on the object of creating an improved cartridge which can be transported in a particularly compact manner in the empty state which still has a comparatively large filling volume and is simple in its handling as well as in its manufacture.

This object is satisfied by a cartridge having the features of claim 1 and in particular thereby that at least one flexible film bag is provided as a cartridge wall and that a rigid front part is provided that is in particular integrally formed, such as in one piece, with the at least one flexible film bag. The rigid front piece is arranged as a front end section of the at least one film bag, this means at an end section remote from the piston of the one or two-component mixing and dispensing system. In order to apply the material present in the flexible film bag, in particular construction material, the rigid front part comprises at least one outlet opening.

In this connection it should be noted that a flexible film bag is a film bag that can be folded together in the unfilled state, for example in the manner of a concertina and after the filling and a possibly subsequent dispensing thereof can be folded open and possibly also closed again without the film bag being damaged thereby or being influenced in its function.

Advantageous embodiments of the invention can be found in the dependent claims, the description and the drawing.

In accordance with an embodiment the flexible film bag comprises a multilayer film and has at least one inner layer and an outer layer. The flexible film bag can have exactly two, exactly three, exactly four, exactly five or more than five layers. Layers in the sense of this invention are layers of the multilayered film but not the coupling agent that is possibly present between the layers. Through the use of a multilayer film it is possible to adapt the film bag to the mechanical and chemical properties of the specific application of the film bag.

In accordance with a further embodiment the rigid front part is an injection molded part which is formed at the film bag by injection molding in order to obtain a fixed connection between the rigid front part and the film bag. Hereby a mechanically loadable and well sealing connection between the film bag and the rigid front part can be produced. Moreover, the connection by injection molded is very suitable for high numbers of production, since this process can be carried out in a highly automated manner.

Alternatively thereto the rigid front part could be connected to the flexible film bag by bonding, shrinking or welding. Also, a mechanical connection by a clip or a clamp—with or without a ring—is plausible.

In accordance with an embodiment at least one layer of the film bag comprises aluminum. The film bag can also comprise one or more intermediate layers which are arranged between the inner layer and the outer layer, wherein an intermediate layer comprises aluminum.

In this connection it should be noted that the inner layer is the innermost layer of the film bag and the outer layer is the outermost layer of the film bag. The layers respectively arranged therebetween are intermediate layers.

In order to minimize the permeation, in particular oxygen permeation and/or water vapor permeation through the film bag a layer can be provided which comprises ethylene vinyl alcohol (EVOH). This layer which comprises the ethylene vinyl alcohol or consists thereof can be arranged between the inner layer and the outer layer. Preferably the layer with or of ethylene vinyl alcohol is directly arranged between next to the outer layer and or directly adjacent to the inner layer.

In accordance with an embodiment, the outer layer of the film bag is made of the same material as the rigid front part. Hereby the outer layer can be connected in a particularly simple manner to the rigid front part by injection molding.

In accordance with an embodiment the inner layer of the film bag comprises a plastic. Preferably, this plastic belongs to the group of thermoplastics. Thereby the recycling capability of the film bag is improved for at the same time a simplification of the manufacture of the film bag.

In accordance with an embodiment the inner layer of the film bag comprises the same material as the rigid front part respectively of a part of the rigid front part that is brought into contact with the film bag. Preferably, the inner layer and the outer layer of the film bag comprise the same material as the rigid front part respectively of a part brought into contact with the film bag of the front end part. Hereby the film bag can be connected in an even better manner to the rigid front part by injection molding.

In accordance with an embodiment the inner layer has a shore D hardness selected between 40 and 99. Preferably the inner layer as a shore D hardness between 40 and 60.

The inner layer of the film bag can, for example, be made of polyethylene, polypropylene, polyamide, polyethylene terephthalate or polybutylene terephthalate. The inner layer can, for example, comprise polyamide in the form of PA-6 or PA-66. Polyamide has the advantage that it has a very high mechanical stability and their stability can be further increased by stretching. Polyethylene terephthalate (PET) in contrast thereto is very cost-effective and has a good chemical resistance.

In accordance with an embodiment the outer layer of the film bag comprises a plastic. The plastic is preferably selected from the group of thermoplastics.

In accordance with an embodiment the outer layer has a shore D hardness selected between 40 and 99. Preferably the outer layer has a shore D hardness between 40 and 60.

Advantageously the outer layer of the film bag is made of polyethylene, polypropylene, polyamide, polyethylene terephthalate or polybutylene terephthalate. The outer layer can, for example, comprise polyamide in the form of PA-6 or PA-66.

In accordance with an embodiment the rigid front part comprises a plastic which preferably belongs to the group of thermoplastics.

The rigid front part can have a shore D hardness selected between 40 and 99. Preferably, the shore D hardness of the rigid front part lies between 40 and 60.

In accordance with an embodiment the rigid front part is made of polyethylene, polypropylene, polyamide, polyethylene terephthalate or polybutylene terephthalate. The rigid front part can for example comprise polyamide in the form of PA-6 or PA-66. Polyamide has the advantage that it has a good high mechanical stability and is also suitable for the rigid front part. Also, polyethylene terephthalate (PET) could be used for the rigid front part. PET can namely be processed easily and has a high chemical resistance.

In accordance with an embodiment the rigid front part is made of a high density polyethylene (HDPE). In the present instance high density polyethylene (HDPE) has a density selected in the range of 930 kg/m$^3$ to 970 kg/m$^3$.

In accordance with an embodiment the at least one film bag is closed at the end remote from the rigid front part by a weld seam. The shape of the rear end can, for example be configured dome-shaped or cone-shaped. Generally, the rear end of the film bag can taper continuously. As an alternative hereto, the film bag can have a rear side that is configured substantially planar.

In accordance with an embodiment the rear end of the film bag is closed with a seam which has the shape of a fin seal. Alternatively or additionally, the film bag can have a lateral seam which is configured as a fin seal. Such seams are understood to be a fin seal for which the two end regions are laid on top of one another such that their end edges point in the same direction.

In accordance with an embodiment the rear end of the film bag is closed at the end by a seam which is configured as an overlap seam. Alternatively or additionally, the film bag can have a lateral seam configured as an overlap seal. Such seams are understood to be an overlap seam for which the two end regions lie on top of one another such that their end edges point in opposite directions.

In accordance with an embodiment the at least one film bag is closed at its end remote from the rigid front part by a clip. Such a clip is preferably made of plastic.

Additionally or alternatively at least one film bag can be closed at the end remote from the rigid front part by an adhesive.

In accordance with an embodiment the film bag is rigid in the direction of movement. The film bag thus has a defined length in the filled state and can thereby be installed in a secure manner in a one or two-component mixing and dispensing system.

Preferably the at least one flexible film bag is configured such that a film test body made from the film bag with a width of 15 mm in a direction which corresponds to the axial direction of the film bag has a tensile strength of at least 50 N, in particular has a tensile strength of at least 18 N. Hereby it is avoided that the film bag will tear on the presence of a strain.

In accordance with an embodiment the film bag has a resistance to perforation between 10 N and 20 N. The resistance to perforation can be determined with reference to the norm DIN EN 14477, r=0.4 for pointy objects or with reference to the norm ASTM F 1306 for blunt objects. The resistance to perforation can, for at least one of the two test norms, lie in the range of 10 N to 20 N. Preferably, the resistance to perforation for both test norms lies in the range of 10 N to 20 N.

Preferably, the inner layer has a larger thickness than the outer layer. The inner layer can for example be 1.5 times as thick as the outer layer. Preferably, the inner layer has a thickness which is twice as large as the thickness of the outer layer.

In accordance with an embodiment the inner layer has a minimum thickness of 50 μm to 90 μm. Preferably, the inner layer has a minimum thickness of 55 μm to 80 μm. The minimum thickness of the inner layer can be selected in dependence of the material used for the inner layer and the volume of the filling material.

In accordance with an embodiment the film bag has an overall material thickness between 80 μm and 150 μm. The film thickness can be determined in accordance with DIN EN ISO 4593. Preferably, the film bag has an overall material thickness between 110 μm and 150 μm.

In accordance with an embodiment the film bag has a total mass per unit area between 100 g/m$^2$ to 170 g/m$^2$. The total mass per unit area can be determined in accordance with DIN EN ISO 2286-2. Preferably, the film bag has a total mass per unit area between 120 g/m$^2$ and 150 g/m$^2$.

In accordance with an embodiment the film bag has a water vapor permeability of at most 0.3/(m$^2$×d) in particular of at most 0.2 g/(m$^2$×d). The water vapor permeability is measured with the norm ISO 15106-3 (38° C./90% r.F.). Preferably, the film bag has a water vapor permeability which lies in the no longer measurable lower range using the norm ISO 15106-3 (38° C./90% r.F.), this means close to 0 g/(m$^2$×d).

In accordance with a further embodiment the film bag has an oxygen permeability of at most 0.3 cm$^3$/(m$^2$×bar×d) in particular of at most 0.2 cm$^3$/(m$^2$×bar×d). The oxygen permeability is measured with the norm ASTM D3985 (23° C./90% r.F.). Preferably, the film bag has an oxygen permeation which lies in the no longer measurable lower range of the norm ASTM D3985 (23° C./90% r.F.), this means close to 0 cm$^3$/(m$^2$×bar×d).

In accordance with an embodiment the outlet opening has a minimum diameter of 1 mm to 12 mm. The outlet opening can be adapted to the volume of the at least one film bag.

In accordance with an embodiment, the outlet opening has a tapering cross-section. Hereby the minimum size of the outlet opening limiting the amount of dispensing can be provided at an end of the outlet opening.

Preferably, the outlet opening has a cross-section tapering inwardly.

Alternatively or additionally, the outlet opening can have a variable settable cross-section. Hereby the dispensing speed can be set to different values.

In accordance with an embodiment, the rigid front part can be formed substantially plate-like. The rigid front part configured substantially plate-like can have at least one nose piece that forms a prolongation of the outlet opening. The nose piece can represent an end section of the cartridge in the axial direction.

The nose piece preferably, at least regionally, has a wall thickness between 0.5 mm and 1.5 mm. Hereby a good compromise between sufficient stability and material cost can be achieved.

The nose piece preferably has a length between 5 mm and 40 mm, in particular between 20 mm and 30 mm. The nose piece should be selected as short as possible in order to be able to empty the cartridge as completely as possible, but should still provide sufficient length in order to be able to plug, for example, a static or dynamic mixer or an outlet onto the nose piece.

In accordance with an embodiment, the nose piece has a length that lies in a range between ⅐ and ⅒ of the overall length of the cartridge in a filled state. This represents a good compromise between material loss and connectability to a static mixer.

In accordance with an embodiment the film bag has a wall thickness and/or a film thickness of at least 60 μm. Preferably, the film bag has a wall thickness respectively a film thickness of at least 80 μm. Hereby it can be assured that the film bag has sufficient mechanical stability.

In accordance with an embodiment each of the layers of the film bag has a thickness of at least 4 μm, in particular of at least 5 μm. However, as already mentioned, a coupling agent between the layers is not considered as a layer. The coupling agent possibly present between the layers could have a thickness of less than 5 μm. Preferably the coupling agent provided between layers of different material has a thickness of 5 μm or less.

In accordance with an embodiment a coupling agent is arranged between at least two of the layers of the film bag with the coupling agent connecting the two layers one to another. When the two layers are made of different materials, the use of a coupling agent is advantageous, since layers of different materials can otherwise not be readily connected one to one another.

In accordance with an embodiment the coupling agent has a thickness of 1 μm to 5 μm. The thickness of the coupling agent should not be smaller 1 μm as otherwise no or very little coupling agent could be present at some positions due to deviations in tolerance. It has moreover been shown that a thickness of the coupling agent of more than 5 μm does not bring about an additional improvement of the bonding between the layers of the film bag.

In accordance with an embodiment each of the layers of the film bag has a thickness between 4 μm and 100 μm. In particular, each of the layers of the film bag can have a thickness between 5 μm and 70 μm. In accordance with a very specific embodiment all layers of the film bag apart from the inner layer have a thickness between 5 μm and 30 μm.

In accordance with an embodiment the at least one film bag has a substantially cylindrical outer shape. Alternatively or additionally to this, the at least one film bag can have a weld seam in an axial direction. The weld seam can be configured as a fin seam. The weld seam can alternatively be also configured as an overlap seal.

In accordance with an embodiment the outer layer of the film bag is arealy connected to the inner wall of the front part. In other words, the outer layer of the film bag is not connected to the inner wall of the front part by a line contact but via a width (or area) of at least 2 mm.

For applications in the field of medical technology or for smaller works in the construction field it can be advantageous when the at least one film bag has a volume in the range of 50 ml to 750 ml. Preferably, a film bag has a volume of 100 ml, 200 ml or 500 ml.

In contrast to this, for larger works, in particular in the construction sector, it can be advantageous when the film bag has a volume selected in the range of 750 ml to 5000 ml. For example, the at least one film bag can have a volume of 1000 ml, 1250 ml, 1500 ml, 2500 ml or 4000 ml.

In accordance with an embodiment the cartridge can be filled with a material. For example, the one or two-component material can be an adhesive, a paint, a sealant, an anti-rust agent, a molding material or similar materials that can typically be dispensed using a dispensing system.

In order to avoid confusion between cartridges and in order to determine what a film bag is filled with in a simple manner a designation of the content of the cartridge may be present at the outer side of the film bag. Preferably, this designation is attached to the film bag shortly before the film bag is formed or following the filling of the film bag. In this way errors on the application of the designation can be minimized.

In accordance with an embodiment the rigid front part has ribs for stiffening the front part at the side of the front part remote from the film bag. The ribs can, for example, extend away from the nose piece over the side of the rigid front piece remote from the flexible film bag. In this way the ribs can be used to stabilize the nose piece, this means to minimize the probability of a breaking off of the nose piece, e.g. an outlet stud.

In accordance with an embodiment, the at least one flexible film bag is configured in such a way that a film test body made from the film bag with a width of 15 mm has a tensile strength of at least 60 N. For testing the film test body the norm DIN ISO 527 7 or the norm ASTM D 882 can selectively be used. The film test body having a width of 15 mm made from the film bag can in particular have a tensile strength of at least 100 N.

In accordance with an embodiment the at least one flexible film bag has a weld seam, for example a fin seal, this means a seam in which one inner side of the film bag is arealy applied onto a further part of the inner side of the film bag, or an overlap seam, this means a seam in which the inner side of the film bag is arealy applied onto an outer side of the film bag. In this embodiment, the at least one flexible film bag can be configured such that a film test body made of the film bag having a width of 15 mm having the sealed seam in the form of a fin seal arranged at its center has a tensile strength of at least 40 N in accordance with DIN 55529. Alternatively thereto the at least one flexible film bag can be configured such that a film test body made of the film bag with a width of 15 mm has the sealed seam in the shape of an overlap seam arranged at its center has a tensile strength of at least 70 N in accordance with DIN 55529.

In accordance with an embodiment the overall tensile strength of the cartridge lies above 200 N, in particular between 200 N and 1000 N measured in accordance with DIN EN ISO 527. Depending on the field of application, in particular in the construction field it is important that the cartridge is not destroyed by a falling on the floor. Such an overall tensile strength is advantageous such that the cartridge when it is accidently dropped does not burst.

The features described with respect to the film bag likewise hold true to a plurality of respectively to all of the film bags of the cartridge. However, it is also plausible that different film bags of the cartridge have different properties.

In accordance with an embodiment, the film bag comprises in particular exactly three layers, with the outer layer being polyethylene (PE), one of the intermediate layers and in particular wherein the intermediate layer is made of aluminum or an aluminum alloy and the inner layer is made of polyethylene (PE).

In accordance with an embodiment the film bag comprises, in particular exactly, five layers, wherein the outer layer is polyethylene (PE), an intermediate layer of aluminum or of an aluminum alloy, a second intermediate layer of polyethylene (PE), polyamide (PA) and/or polyethylene terephthalate (PET), a third intermediate layer of polyethylene (PE), polyamide (PA) and/or polyethylene terephthalate (PET) and the inner layer is of polyethylene (PE).

In accordance with a further embodiment, the film bag can comprise more than five layers. The film bag can have an outer layer of polyethylene (PE), an intermediate layer of aluminum or of an aluminum alloy, a further intermediate layer of polyethylene (PE), polypropylene (PP), polyamide (PA), polybutylene terephthalate (PBT) and/or polyethylene terephthalate (PET) and an inner layer of polyethylene (PE).

In accordance with a further embodiment the film bag can have at least eight layers. The film bag preferably has at least ten layers. In this connection at least one of the layers can be made of a recycled material. In order to manufacture a particularly environmentally friendly product, all of the layers can preferably be formed of recycled material.

In accordance with an embodiment the film bag can have at least one layer of an oriented polyamide film. The polyamide film can for example be provided with an orientation by stretching. Preferably the film bag has a bi-axially orientated polyamide film. The oriented polyamide film can be configured as an intermediate layer or as an outer layer. An advantage of such an oriented polyamide film is its improved mechanical stability.

In accordance with a specific embodiment the cartridge is configured as a two-component cartridge for a two-component mixing and dispensing system. The cartridge can have a first flexible film bag as a cartridge wall that is connected in one piece with a first rigid front part, wherein the rigid front part is arranged at a front end section of the first film bag and can have a second flexible film bag as a cartridge wall that is connected in one piece with a second rigid front part, wherein the second rigid front part is arranged at a front end section of the second film bag. In this connection the first rigid front part and the second rigid front part can form a rigid structure that comprises at least one outlet opening.

In accordance with an embodiment the first rigid front part and the second rigid front part of the cartridge for a two-component mixing and dispensing system can be releasably connected to one another. For example, the first rigid front part and the second rigid front part can be magnetically connectable to one another. Alternatively, the first rigid front part and the second rigid front part can be releasably connected to one another by shape matching.

In accordance with an embodiment the first rigid front part and the second rigid front part are connected to one another to be releasable in such a way that the first film bag and the second film bag extend in parallel to one another. The first rigid front part and the second rigid front part thus comprise connection elements matching one another that permit the connection of the first front part and of the second rigid front part to one another in such a way that these have a defined position with respect to one another. This position is preferably selected in such a way that the first film bag and the second film bag lie next to one another, in particular in parallel to one another.

In accordance with an embodiment the first rigid front part and the second rigid front part each comprise part of a snap fit connection such that the first rigid front part and the second rigid front part can be connected to one another by this snap-fit connection. This snap-fit connection can be produced directly at the rigid front parts during their manufacture.

Preferably a first part cartridge formed from the first rigid front part and the first film bag is configured as a cartridge in accordance with at least one of the previously or subsequently described embodiments. Alternatively or additionally, also a second part cartridge formed from the second rigid front part and the second film bag can be configured as a cartridge in accordance with one of the previously or subsequently described embodiments.

Moreover, the invention relates to a one or two-component mixing and dispensing system having a cartridge in accordance with any one of the preceding claims, wherein the mixing and dispensing system has a structure surrounding the cartridge in particular a structure of aluminum and/or plastic.

The one or two-component mixing and dispensing system can be actuated manually, this means by the strength of the person using the system. Alternatively to this, the one or two-component mixing and dispensing system can be electrically and/or pneumatically driven.

Further advantageous embodiments of the invention are clear for the person skilled in the art in a natural way. In this respect, reference is made to the two applications filed by the present applicant at the European Patent Office with the file references EP 18 198 353.7 and EP 18 198 347.9 whose contents is hereby respectively included by reference.

BRIEF DESCRIPTION OF THE DRAWINGS

The invention will be explained in more detail hereinafter with reference to the drawings.

DETAILED DESCRIPTION OF THE EMBODIMENTS

Figure 1:
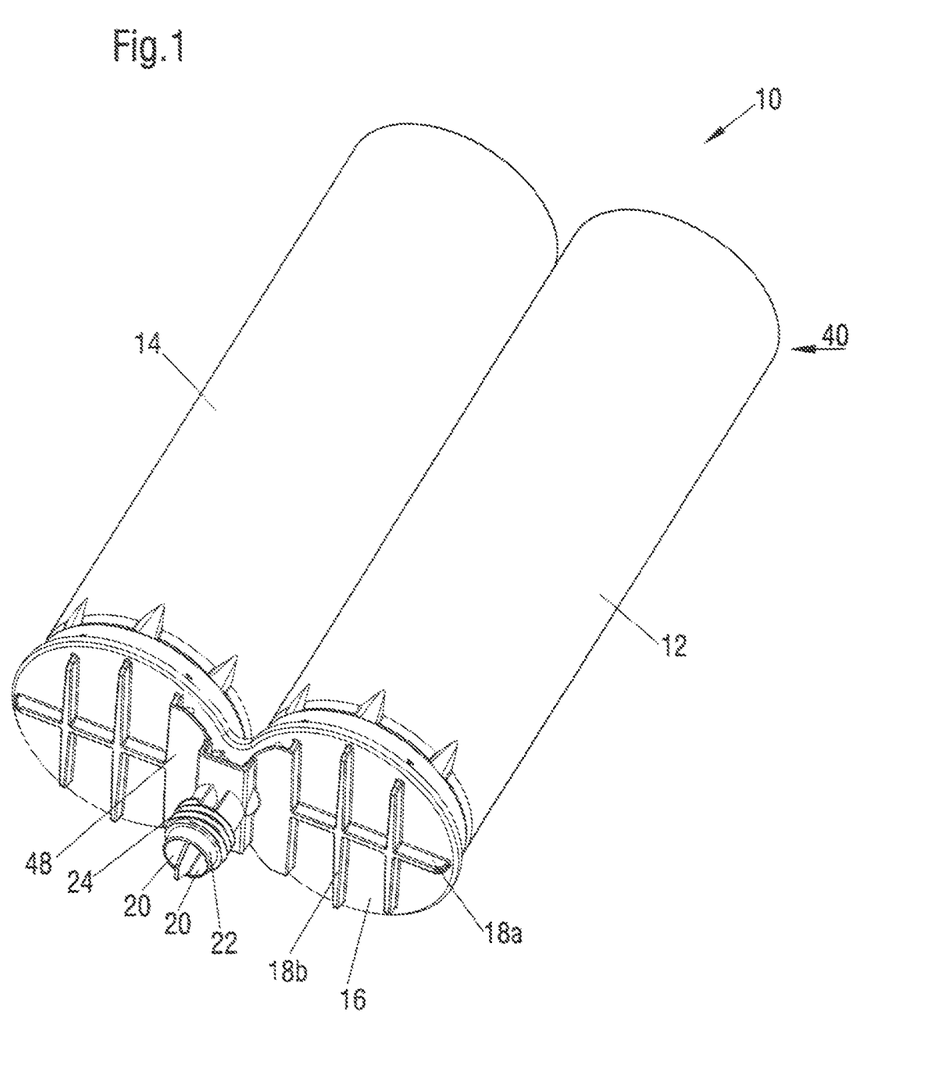
FIG. 1 is a perspective illustration of a two-component cartridge in accordance with the invention.

FIG. 1 shows a side-by-side cartridge 10 that is configured to be inserted into a corresponding two-component mixing and dispensing system, for example the COX and MK dispenser of Sulzer MIXPAC. The cartridge 10 comprises a first flexible film bag 12 and a second flexible film bag 14. The flexible film bags 12, 14 are connected to a rigid front part 16 at their front end. The rigid front part 16 is configured substantially plate-like and extends perpendicular to the main direction of extent of the flexible film bags 12, 14.

The rigid front part 16 has ribs 18 at a side remote to the flexible film bags 12, 14. The ribs 18 extend substantially over the overall surface of the side of the rigid front part 16 remote from the flexible film bags 12, 14. In this connection the lateral ribs 18b extend perpendicular to a main rib 18a which is configured for the reception of bending moments exerted onto the rigid front piece 16 which are formed by a dispensing of materials from the flexible film bags 12, 14.

The rigid front piece 16 is formed in one piece with the first flexible film bag 12 and with the second flexible film bag 14 in that the rigid front piece 16 is over molded at the flexible film bags 12, 14 by injection molding. Two outlet openings 20 are formed into the rigid front part 16, with a first outlet opening 20 being connected to the first flexible film bag 12 in a fluid conducting manner and a second outlet opening 20 being connected to the second flexible film bag in a fluid conducting manner or both being able to be brought into such a connection. The two outlet openings 20 are formed by a nose piece 22. The nose piece 22 has a thread at its outer circumferential surface onto which, for example, a static mixer can be screwed.

Figure 2:
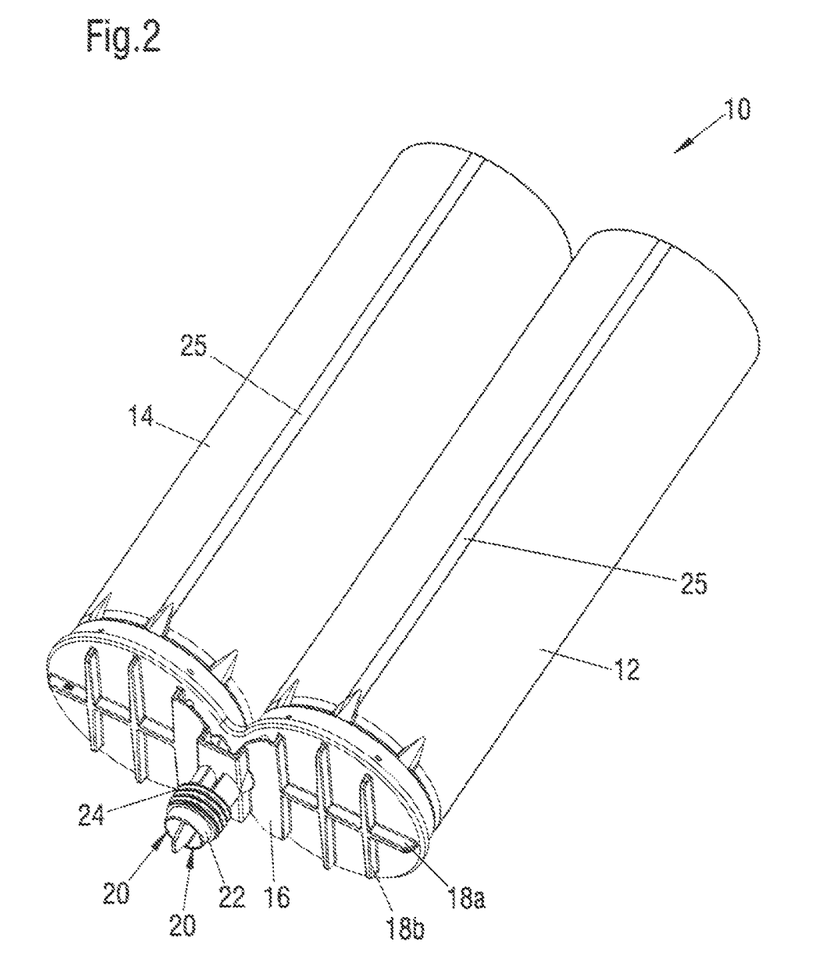
FIG. 2 is a perspective illustration of a two-component cartridge in accordance with the invention in accordance with a second embodiment.
Figure 8:
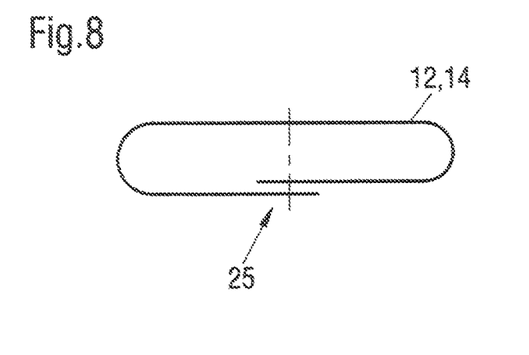
FIG. 8 is a principle sketch of a seam of the film bag in accordance with a first embodiment.
Figure 9:
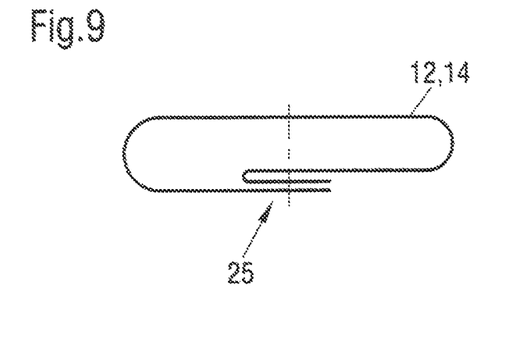
FIG. 9 is a principle sketch of a seam of the film bag in accordance with a second embodiment.

In FIG. 2, a slightly different variant of a cartridge 10 is shown. In this embodiment the flexible film bags 12, 14 each have a weld seam 25 extending in an axial direction at the circumferential side. The flexible film bags 12, 14 are thus produced by a rolling of the film and a subsequent welding of end regions of the film to film bags 12, 14. In this connection, the weld seam 25, as illustrated in FIG. 8, can be formed by an overlap seal. Alternatively hereto the weld seam 25, as shown in FIG. 9 can be configured as a fin seal.

Figure 3:
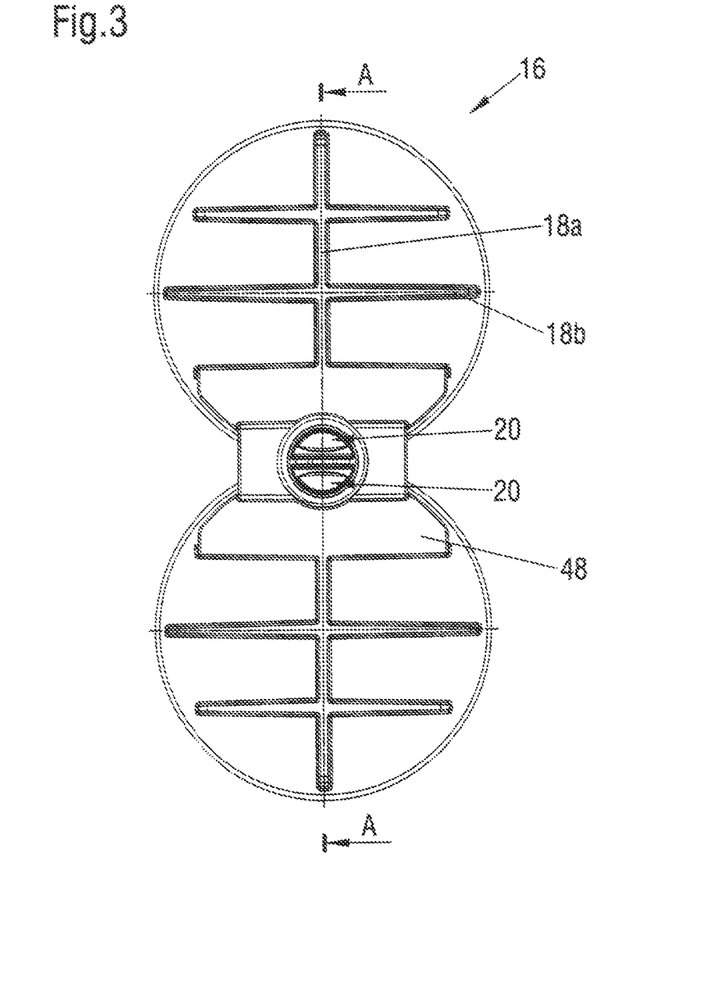
FIG. 3 is a front view of a two-component cartridge in accordance with FIG. 1 or FIG. 2.

FIG. 3 shows the rigid front part 16 from the front. In this connection one can recognize that the rigid front piece 16 has the shape of two circles connected one to another. The shape of the rigid front piece is in this connection adapted to the cross-sectional shape of the first flexible film bag 12 and of the second flexible film bag 14, which in the filled state have a cylindrical shape and are arranged in parallel to one another.

Figures 4, 5:
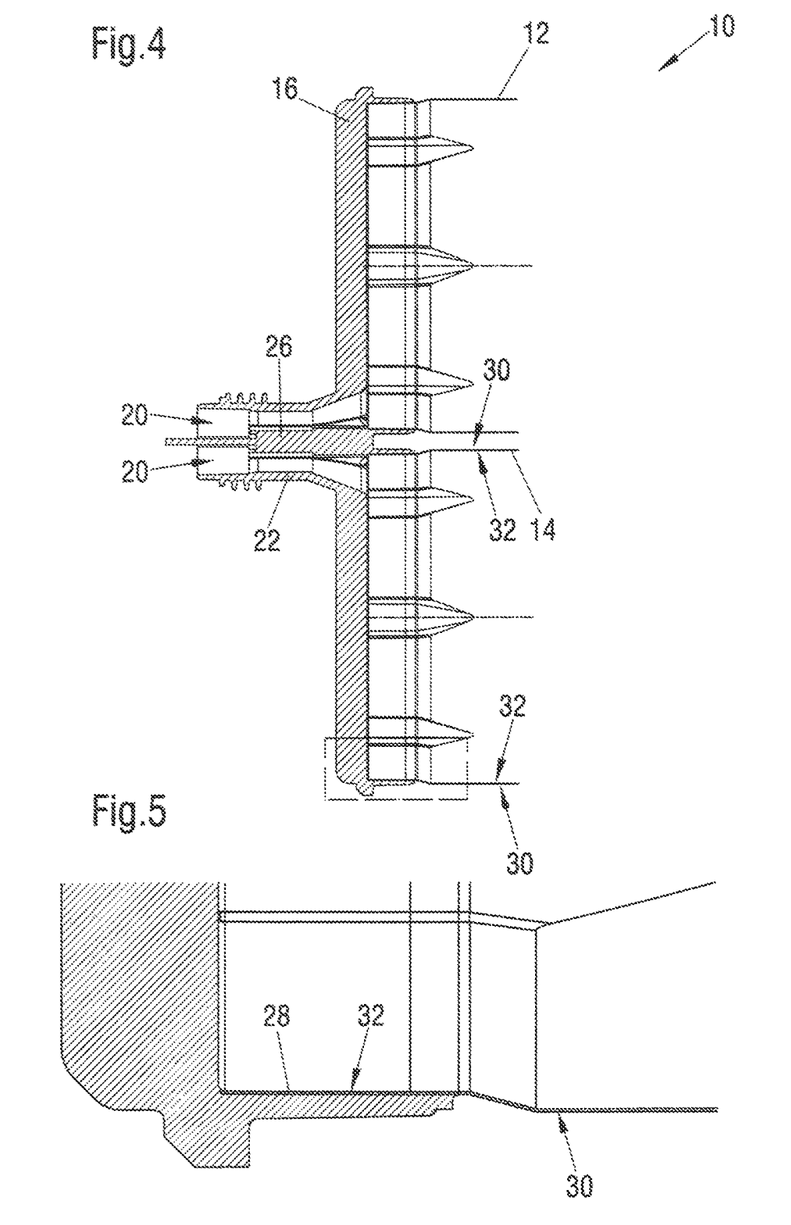
FIG. 4 is a lateral sectional view of a rigid front part of a two-component cartridge in accordance with FIG. 1 or FIG. 2.
FIG. 5 is a detailed view of the boundary of the rigid front part of FIG. 4.

FIG. 4 shows a lateral sectional illustration of the rigid front part 16. One can see in more detail that the two outlet openings 20 each extend in parallel to one another and that one of the outlet openings 20 is connected to the first flexible film bag 12 in a fluid-conducting manner and the second outlet opening 20 is connected to the second flexible film bag 14 in a fluid conducting manner. The outlet openings 20 are separated from one another along the nose piece 22 by a web 26.

In FIG. 5 it is shown how the connection between the flexible film bag 12 and the rigid front part 16 is configured. The rigid front part 16 forms an inner circumferential surface 28 which is aerially connected to an outer layer 30 of the flexible film bag.

In order to ensure a good connection between the outer layer 30 of the flexible film bag 12 and the inner circumferential surface 28 of the rigid front part 16, the two parts should as far as possible be formed of the same material. An innermost layer of the flexible film bag 12 is referred to as an inner layer 32. In the embodiment shown, however, the inner layer 32 does not lie at a section of the rigid front piece 16.

Figure 6:
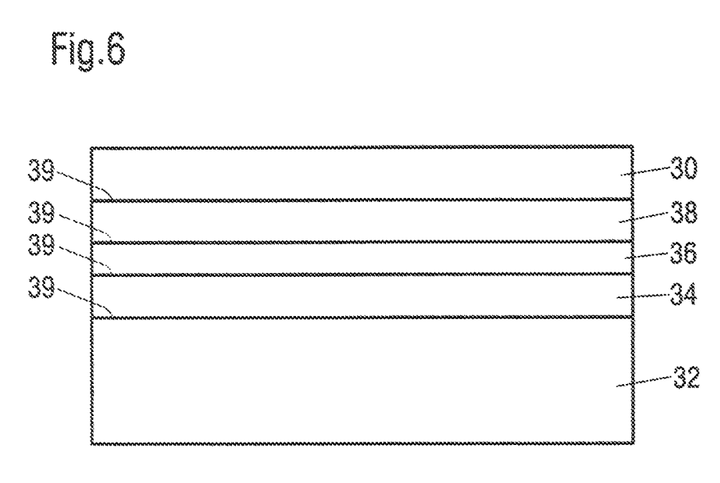
FIG. 6 is a principle sketch of a layer structure of a film bag in accordance with a first embodiment.
Figure 7:
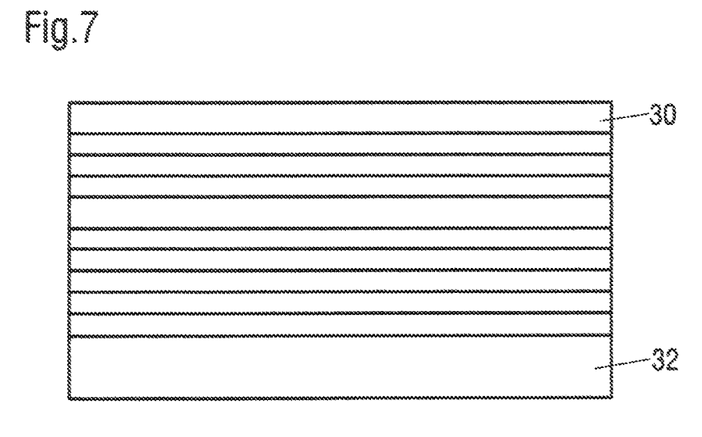
FIG. 7 is a principle sketch of a layer assembly of a film bag in accordance with a second embodiment.

In the FIGS. 6 and 7 an assembly of a flexible film bag 12 is respectively shown. In FIG. 6 a five-layered assembly of a flexible film bag 12 is shown. In this connection the inner layer 32 is made of polypropylene. The inner layer 32 as can be seen in FIG. 6 is the thickest layer of the multi-layered film. A first intermediate layer 34 is made of polyamide. On this intermediate layer 34 of polyamide a further intermediate layer 36 follows which can be composed of aluminum or EVOH. A further intermediate layer 38 of polyamide then follows this. An outer layer 30 of polypropylene then follows the intermediate layer 38 of polyamide. A coupling agent 39 is respectively provided between the respective layers, this means between the inner layer and the first intermediate layer 34, between each of the intermediate layers 34, 36 and 38 and between the intermediate layer 38 and the outer layer 30. This coupling agent 39 acts as an adhesive and holds the individual layers 30 to 38 together.

Generally, the flexible film bags 12, 14 can comprise at least two layers of different materials. For example, a five-layered film bag can have an outer layer 30 having a thickness between 20 and 40 µm of PE. This can be connected via a coupling agent 39 which has a thickness of 1.5 to 2.5 µm to a layer of PA which has a layer thickness of 10 µm to 20 µm. The PA layer can be connected via a coupling agent (thickness 1.5 to 2.5 µm) to a 5 to 10 µm thick layer of aluminum or aluminum alloy. This layer in turn can then be connected via a coupling agent 39 (thickness 1.5 to 2.5 µm) to a PA layer which has a thickness between 10 and 20 µm. The PA layer is then connected to the inner layer 32 which can have a layer thickness between 45 to 100 µm.

In FIG. 7, a further layer assembly of a flexible film bag 12 is shown. This film bag has eleven layers. These layers can likewise be bonded one to another with a coupling agent 39. The layers shown in FIG. 7 are all composed of a recycled material.

Figure 10:
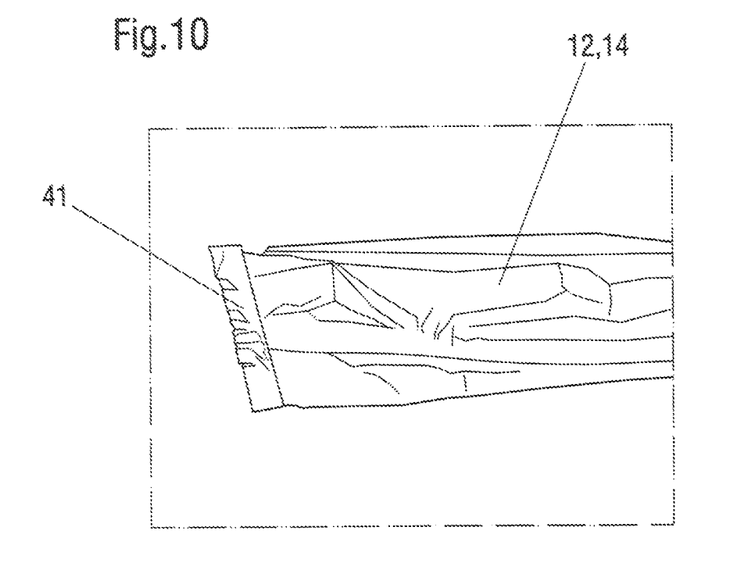
FIG. 10 is an illustration of a seam of the film bag in accordance with a third embodiment.
Figure 11:
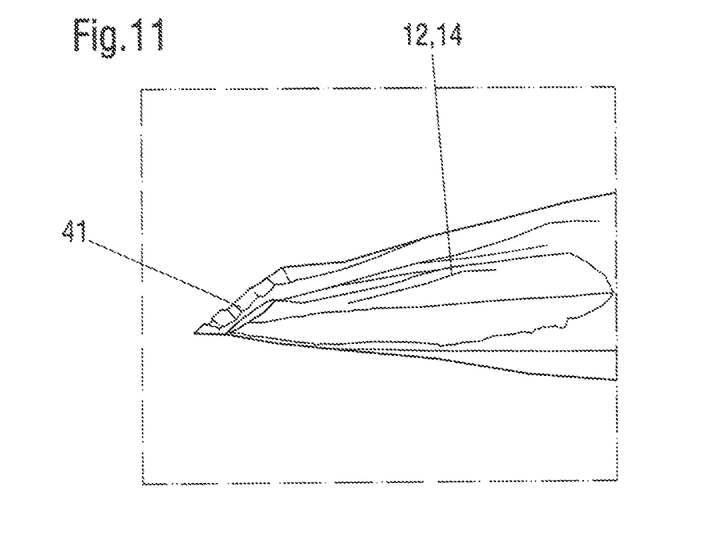
FIG. 11 is a further illustration of the seam of the film bag of FIG. 10.

In FIG. 10, a possibility is shown of how the first flexible film bag 12 or of how the second flexible film bag 14 can be closed off at their respective rear end sections. As can be seen in FIG. 11 the film bag is laterally folded such that four layers of the flexible film bag 12 aerially lie on top of one another. End sections of the layers lying on top of one another are subsequently welded one to another. In this way a final weld seam 41 known from coffee packages is formed.

Figure 12:
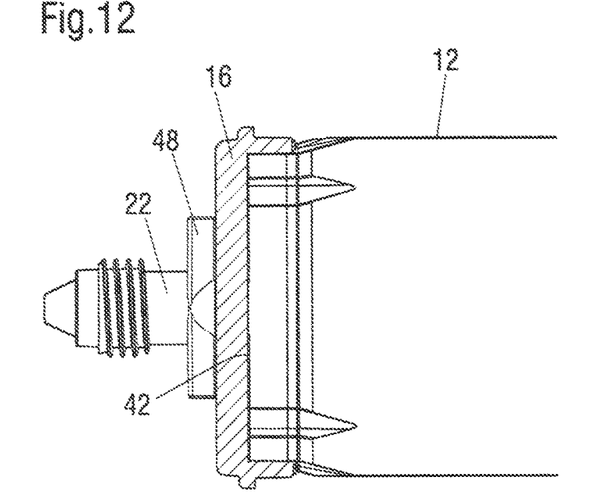
FIG. 12 is a lateral sectional view of a rigid front part with a film attached at the front end.
Figure 13:
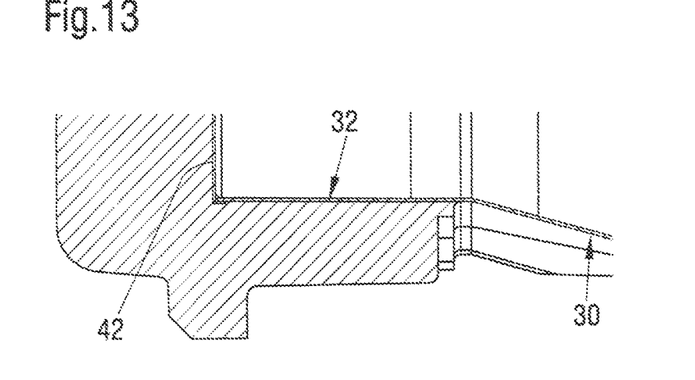
FIG. 13 is a detailed view of the boundary of the rigid front part of FIG. 12.

In the FIGS. 12 and 13, a further embodiment of a connection with the rigid front part 16 to the flexible film bag 12 is shown. In this connection a further film 42 is arranged at an inner lying end side of the rigid front part 16. This further film 42 can likewise be connected in one piece to the rigid front part 16. The further film 42 is preferably at least regionally connected to a predetermined breaking point such that on dispensing a material from the flexible film bag 12 the further film 42 is destroyed at the predetermined breaking point.

Figure 14:
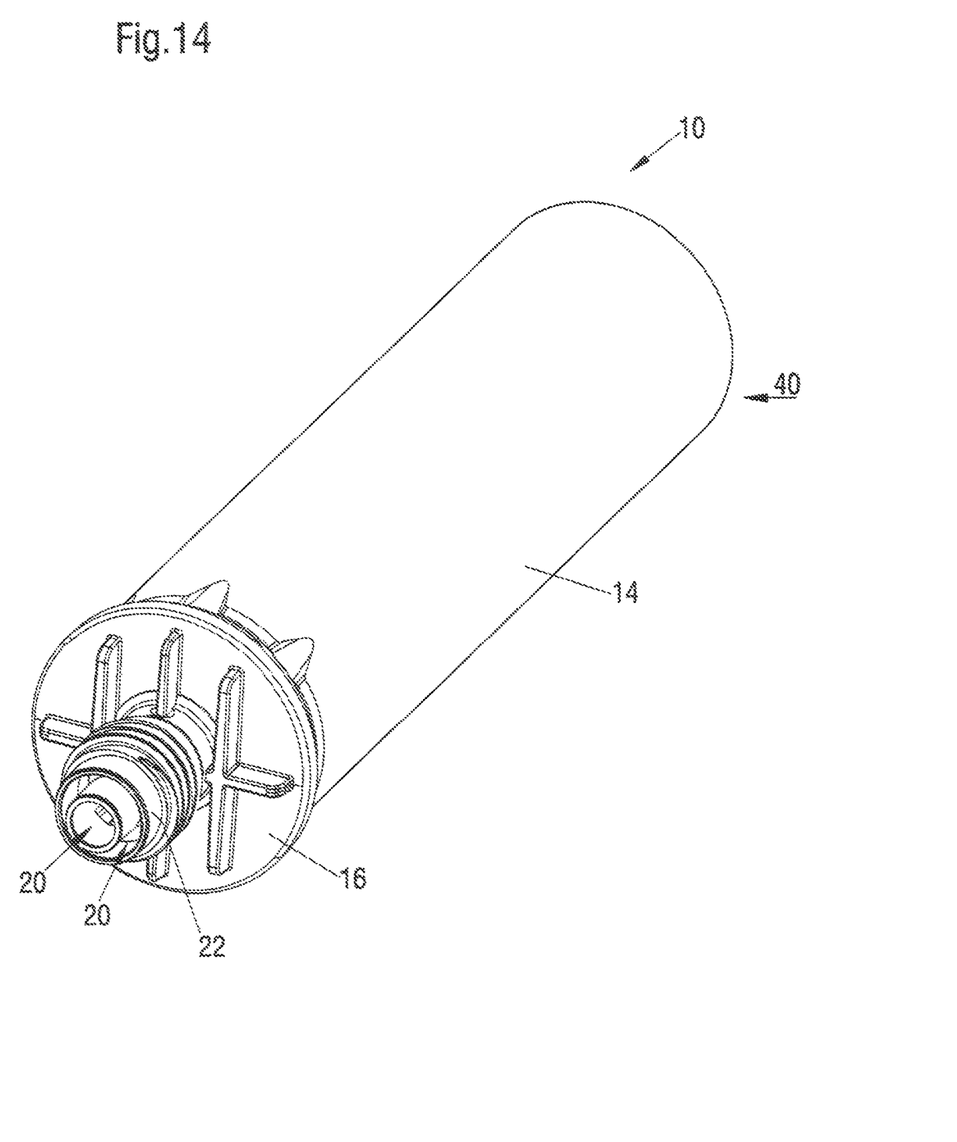
FIG. 14 is a perspective illustration of a coaxial two-component cartridge in accordance with the invention.

In FIG. 14, a variant of the cartridge 10 is shown in which the first flexible film bag and the second flexible film bag 14 are arranged coaxially with respect to one another in the cartridge 10. Preferably the inner first film bag 12 is in contact with the material in the outer second film bag 14 in the filled state. The outlet opening 20 for the materials of the two film bags 12, 14 are likewise arranged coaxially with respect to one another. Such a construction shape of the cartridge 10 has the advantage that only one piston is required in order to dispense the material from the first film bag 12 and in the second film bag 14. A further advantage of this construction consists therein that the cartridge 10 is comparatively compact.

Figure 15:
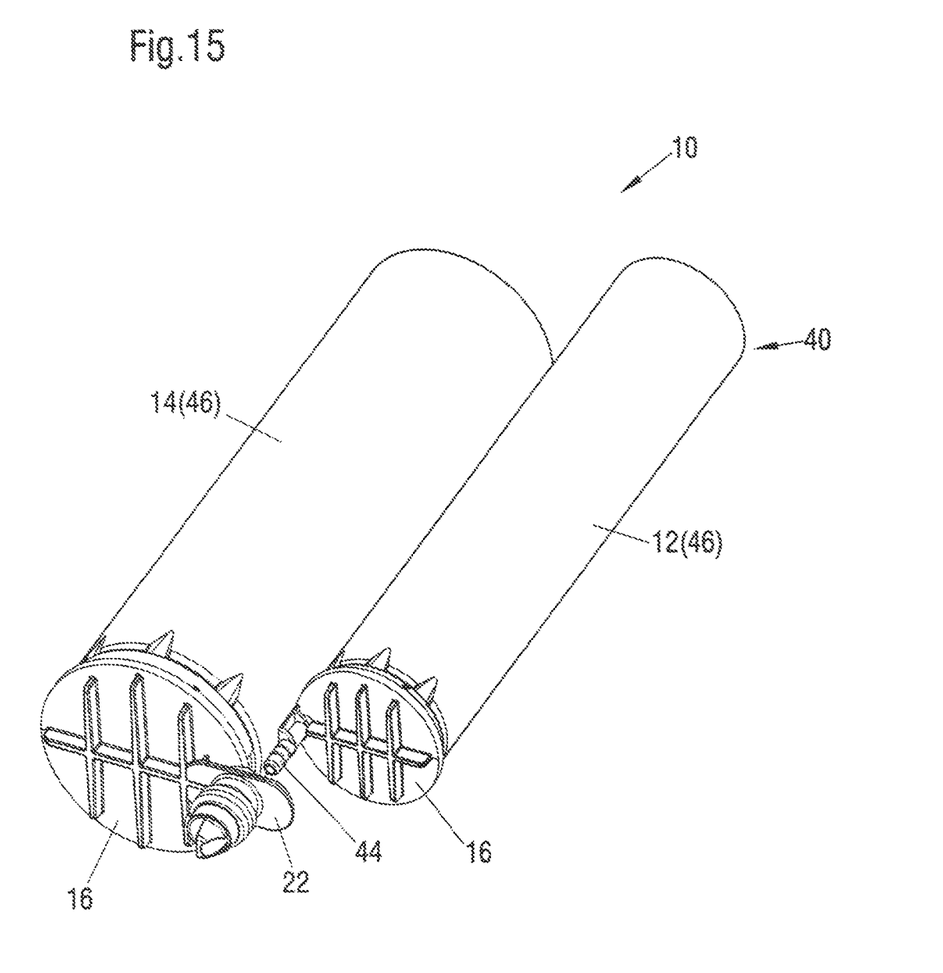
FIG. 15 is a perspective illustration of a two-component cartridge in accordance with the invention in which the individual part cartridges are clipped one to another.

In FIG. 15 a further variant of the cartridge 10 is shown in which the first flexible film bag 12 and the second flexible film bag 14 are respectively clipped one to another at the outlet nose piece 22. For this purpose, non-shown latch openings are provided at the nose piece 22 into which a respective latch nose 44 can be clipped. This variant of the cartridge 10 has the advantage that different types of partial cartridges 46 can be used with one another. Preferably, the tongue and groove-like connection formed by the latching openings and the latching bolts 44 can be configured releasable.

Figure 16:
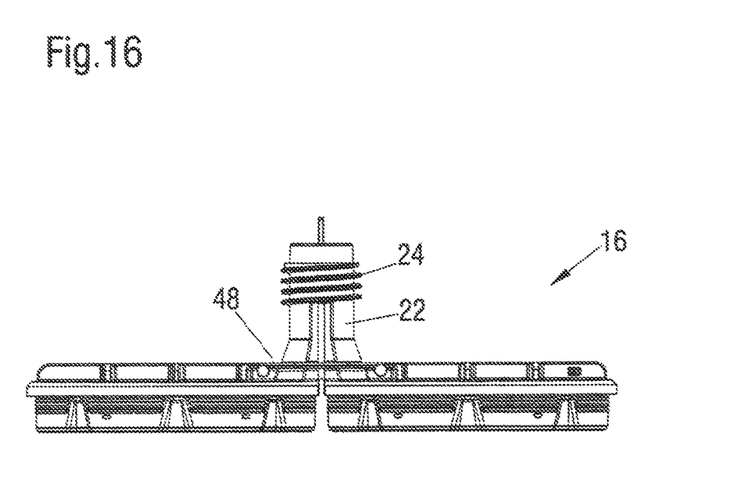
FIG. 16 is a side view of a rigid front part of a two-component cartridge in accordance with a further embodiment.
Figure 17:
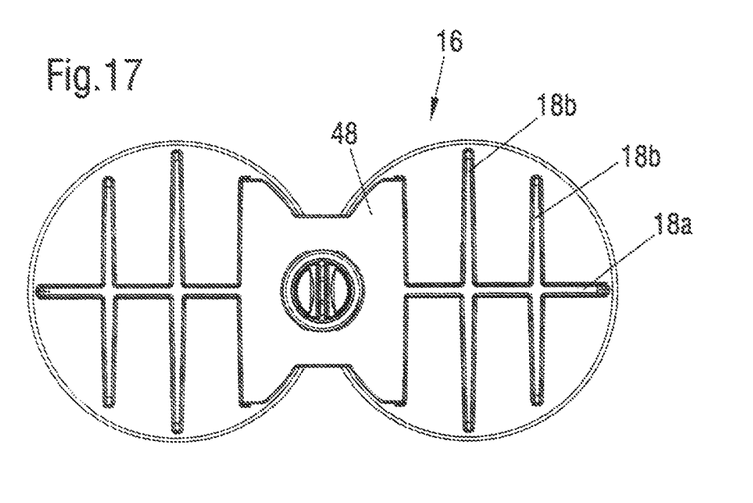
FIG. 17 is a front view of the rigid front part of FIG. 16.

In the FIGS. 16 and 17 a further embodiment with the rigid front piece 16 is shown in which a stiffening plate 48 is provided. The stiffening plate 48 extends from a circular section of the rigid front part 16 to the other circular section of the rigid front part 16. The stiffening plate 48 forms a part of the nose piece 22 and in this way also a part of the outlet opening 20.

What is claimed is:

1. A cartridge for a one or two-component mixing and dispensing system, comprising:
   at least one flexible film bag as a cartridge wall, a rigid front part that is arranged at a front end section of the at least one film bag, the rigid front part comprising at least one outlet opening,
   the at least one film bag comprising a film having multilayers, the multilayers of the film comprising at least an inner layer and an outer layer,
   at least one layer of the multilayers of the film bag comprising one of the following: aluminum, ethylene vinyl alcohol, recycled material, polyethylene, high-density polyethylene, polypropylene, polyamide, polybutylene terephthalate, polyethylene terephthalate, an orientated polyamide film and a biaxially orientated polyamide film,
   a coupling agent arranged between at least two layers of the multilayers of the film bag, with the coupling agent connecting the two layers to one another,
   the film bag having a wall thickness of at least 60 μm,
   each of the layers of the film bag having a thickness in the range of 5 μm to 100 μm, and
   the inner layer has a larger thickness than the outer layer, and the inner layer has a minimum thickness of 50 μm to 90 μm.

2. The cartridge for a one or two-component mixing and dispensing system in accordance with claim 1, wherein
   the inner layer and an outer layer being a first layer and a second layers of at least three layers.

3. The cartridge for a one or two-component mixing and dispensing system in accordance with claim 2, wherein
   the film bag has an overall material thickness selected between 80 μm and 150 μm, or
   the film bag has a total mass per unit area of between 100 g/m2 and 170 g/m2.

4. The cartridge for a one or two-component mixing and dispensing system in accordance with claim 1, wherein
   at least one of the inner layer of the film bag and the outer layer of the film bag is made of the same material as the rigid front part.

5. The cartridge for a one or two-component mixing and dispensing system in accordance claim 1, wherein
   at least one of the inner layer of the film bag, the outer layer of the film bag, and the rigid front piece comprises one of a plastic and a thermoplastic.

6. The cartridge for a one or two-component mixing and dispensing system in accordance with claim 1, wherein
   at least one of the inner layer has a shore D hardness between 40 and 99.

7. The cartridge for a one or two-component mixing and dispensing system in accordance with claim 1, wherein
   at least one of the inner layer of the film bag, the outer layer of the film bag and the rigid front piece is made of polyethylene, poly-propylene, polyamide, polyethylene terephthalate, polybutylene terephthalate, or a high density polyethylene.

8. The cartridge for a one or two-component mixing and dispensing system in accordance with claim 1, wherein
   the at least one film bag is closed at an end remote from the rigid front part by one of a weld, a clip and am adhesive.

9. The cartridge for a one or two-component mixing and dispensing system in accordance with claim 1, wherein
   the film bag is non-elastically deformable in a direction of movement, or
   the at least one flexible film bag is configured such that a film test body made from the film bag with a width of 15 mm in a direction that corresponds to an axial direction of the film bag has a tensile strength of at least 50 N, or
   the film bag has a resistance to perforation of between 10 to 20 N, or
   the film bag has a water vapor permeability of at most 0.3 g/(m2×d), or
   the film bag has an oxygen permeability of at most 0.3 $cm^3/(m^2 \times bar \times d)$.

10. The cartridge for a one or two-component mixing and dispensing system in accordance with claim 1, wherein
    the outlet opening has a minimum diameter of 1 mm to 12 mm, or
    the outlet opening has a tapering cross-section, or
    the outlet opening has a cross-section that tapers inwardly, or
    the outlet opening has a variable cross-section.

11. The cartridge for a one or two-component mixing and dispensing system in accordance with claim 1, wherein
    the rigid front part is configured at least substantially plate like and comprises at least one nose piece that forms a prolongation of the outlet opening,
    at least a portion of the nose piece at least a wall thickness selected in the range of 0.5 mm to 1.5 mm, or
    the nose piece has a length selected between 5 mm and 40 mm,
    the nose piece has a length that lies in a range selected between ⅕ and ⅒ of an overall length of the cartridge in a filled state.

12. The cartridge for a one or two-component mixing and dispensing system in accordance with claim 1, wherein
    the at least one film bag has an at least a substantially cylindrical outer shape; or
    the at least one film bag has a weld seam in an axial direction, or with the weld seam being formed as one of a fin seal and an overlap seal, or
    the at least one film bag has the weld seam in the axial direction, with the weld seam being formed as one of a fin seal and an overlap seal, or
    the outer layer of the film bag is already connected to an inner wall of the front part, or
    the film bag has a volume selected in the range of 50 ml to 750 ml, or
    the film bag has a volume selected in the range of 750 ml to 5000 ml, or
    the film bag has a volume of 1000 ml, 1250 ml, 1500 ml, 2500 ml or 4000 ml, or a designation of the content of the cartridge is present at an outer side of the film bag, or the rigid front part has ribs that stiffen the front part at a side of the front part remote from the film bag, or the at least one flexible film bag is configured such that a film test body made from the film bag with a width of 15 mm in a direction that corresponds to an axial direction of the film bag has a tensile strength of at least 60 N, or the at least one flexible film bag has the weld seam, or the at least one flexible film bag has one of the fin seam and the overlap seam, and either the at least one flexible film bag is configured such that the film test body made from the film bag with the width of 15 mm has a sealed seam in a form of the fin seal at a center thereof with a tensile strength of at least 40 N in accordance with DIN 55529, or such that the film test body made from the film bag with the width of 15 mm has the sealed seam in the form of the overlap seam at a center with a tensile strength of at least 70 N in accordance with DIN 55529, or an overall tensile strength of the cartridge lies above 200 N, or a rear end of the film bag continuously tapers in a filled state.

13. The cartridge for a one or two-component mixing and dispensing system in accordance with claim 1, wherein a rear end of the film bag is dome-shaped or cone-shaped, or the rear side of the film bag is substantially planar in a filled state, or either the rear end of the film bag is closed with a seam configured as a fin seal or the film bag has a lateral seal configured as a fin seal, or the rear end of the film bag is closed with a seal configured as an overlap seal, or the film bag has a lateral seal configured as an overlap seal.

14. The cartridge for a one or two-component mixing and dispensing system in accordance with claim 1, wherein the rigid front part is integrally formed with the at least one flexible film bag.

15. The cartridge for a one or two-component mixing and dispensing system in accordance with claim 1, wherein the rigid front part is an injection molded part formed at the film bag by injection molding in order to obtain a fixed connection between the rigid front part and the film bag.

16. The cartridge for a one or two-component mixing and dispensing system in accordance with claim 1, wherein the cartridge is filled with a material.

17. The cartridge for a one or two-component mixing and dispensing system in accordance with claim 1, wherein at least one of the inner layer of the film bag, the outer layer of the film bag and the rigid front piece is made of a high density polyethylene having a density selected in the range of 930 kg/m$^3$ to 970 kg/m$^3$.

* * * * *